United States Patent [19]

Simard

[11] Patent Number: 5,473,730
[45] Date of Patent: Dec. 5, 1995

[54] HIGH EFFICIENCY LEARNING NETWORK

[75] Inventor: Patrice Y. Simard, Eatontown, N.J.

[73] Assignee: AT&T IPM Corp., Coral Gables, Fla.

[21] Appl. No.: 150,677

[22] Filed: Nov. 9, 1993

[51] Int. Cl.$^6$ .............................. G06F 15/18; G06K 9/66
[52] U.S. Cl. .................. 395/24; 395/27; 395/23
[58] Field of Search ................... 395/23, 24, 27, 395/22

[56] References Cited

U.S. PATENT DOCUMENTS

| | | | |
|---|---|---|---|
| 4,972,363 | 11/1990 | Nguyen et al. | 395/24 |
| 4,994,982 | 2/1991 | Duranton et al. | 395/27 |
| 5,058,179 | 10/1991 | Denker et al. | 395/22 |
| 5,067,164 | 11/1991 | Denker et al. | 395/22 |
| 5,097,141 | 3/1992 | Leivian et al. | 395/27 |
| 5,109,351 | 4/1992 | Simar, Jr. | 395/27 |
| 5,131,072 | 7/1992 | Yoshizawa et al. | 395/24 |
| 5,138,924 | 8/1992 | Ohya et al. | 395/22 |
| 5,167,006 | 11/1992 | Furuta et al. | 395/27 |
| 5,222,195 | 6/1993 | Alkon et al. | 395/27 |
| 5,228,113 | 7/1993 | Shelton | 395/23 |
| 5,255,346 | 10/1993 | Wu et al. | 395/27 |
| 5,274,746 | 12/1993 | Mashiko | 395/27 |
| 5,337,395 | 8/1994 | Vassiliadis et al. | 395/27 |

FOREIGN PATENT DOCUMENTS 3268078   11/1991   Japan ........................................ 395/24

OTHER PUBLICATIONS

Rumelhart et al, "Parallel Distributed Processing" vol. 1, The MIT Press, 1986.
Tank et al, "Simple Neural Optimization Network", IEEE Trans. on Circuit & Systems, May 1986.
Suter et al, "Neural Wet Simulation on Transputers", Royal Melbourne Institute of Tech., Jun. 23–24, 1988.

Primary Examiner—George B. Davis
Attorney, Agent, or Firm—Christopher N. Malvone

[57] ABSTRACT

Nodal outputs are discretized to values of $S2^n$ where n is an integer and S is equal to +1 or −1. During forward propagation, this offers the advantage of forming a product of a nodal output and a weight using a simple shift operation rather than a multiply operation. Replacing multiply operations with shift operations through out a neural network improves response times and permits building larger networks that have broader applicability. Training is also improved by increasing the efficiency of backward propagation. The multiplications involved in backward propagation are reduced To shift operations by discretizing the errors associated with each node so that they are represented as $2^n$ where n is an integer and S is equal to +1 or −1.

31 Claims, 5 Drawing Sheets

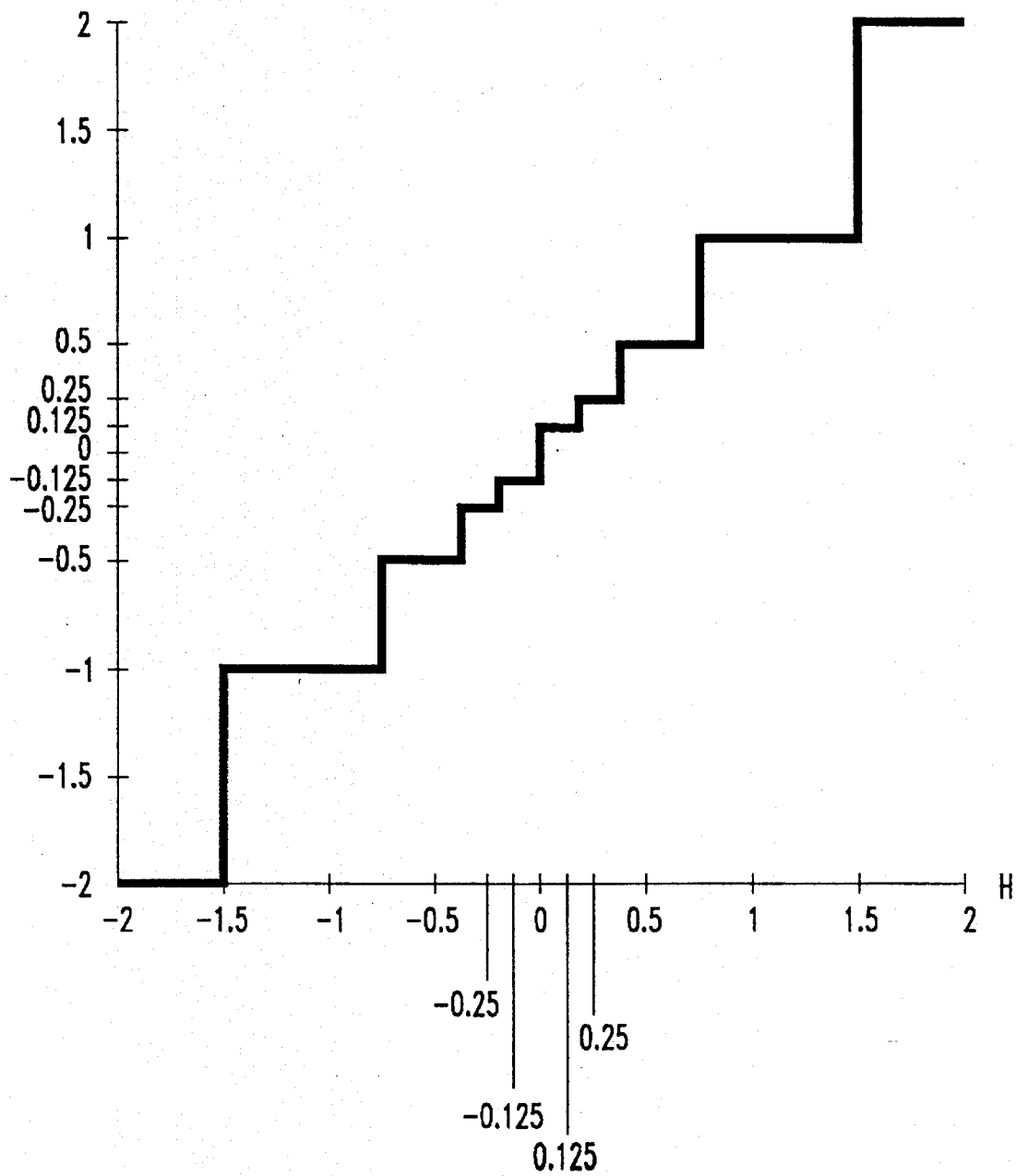

HIGH EFFICIENCY LEARNING NETWORK

FIELD OF THE INVENTION

The invention relates to learning networks; more specifically, learning networks with high efficiency forward propagation and backward propagation.

DESCRIPTION OF THE PRIOR ART

Learning networks or neural networks are available in a variety of architectures that are implemented in hardware, software or a combination of hardware and software. U.S. Pat. No. 5,067,164 entitled "Hierarchical Constrained Automatic Learning Neural Network for Character Recognition" and U.S. Pat. No. 5,058,179 entitled "Hierarchical Constrained Automatic Learning Network for Character Recognition" disclose two of many architectures available to learning networks. Learning networks comprise computational nodes or neurons that perform an activation function using a sum of its inputs as an operand to provide an output. These nodes are typically arranged in layers with the output of a node from one layer being connected to the input of several nodes of the next layer. Each input to a node is typically multiplied by a weight before being summed by the node.

Learning networks or neural networks typically include a large number of nodes or neurons that receive inputs from many other neurons within the learning network. This results in an architecture where there are many interconnections between the outputs and inputs of the nodes. As mentioned earlier, these interconnections normally include a multiplication function. As a result, large neural networks require a large number of multiplications to produce an output. In addition, these multiplications typically involve multiplying a 16-bit word by another 16-bit word and thereby require a great deal of computational power. As a result of these computational requirements, large neural networks often have slow response times and slow training times.

With the ever-expanding demand for products that involve functions such as speech recognition, handwriting recognition and pattern recognition, there is an increasing need for large neural networks with fast response times and short training times.

SUMMARY OF THE INVENTION

The present invention provides a learning or nodal network that replaces multiplications with a shift operation. A shift operation greatly reduces the computational overhead of the learning network. As a result, networks with large numbers of interconnections can be provided while maintaining fast response times and fast training times.

The present invention decreases computation overhead by discretizing the output of each node or neuron of the network so that its output is represented by $S2^n$ where n is an integer and S is +1 or −1. This offers the advantage of implementing the multiplication associated with each connection by shifting the weight associated with that connection n times. As a result, each connection of the network uses a simple shift operation as opposed to a multiply operation.

In the training or backward propagation mode, the gradient used to adjust the weights is also represented as $S2^n$ where n is an integer and S is 1 or −1. This enables the value of new weights to be calculated by using a simple shift operation as opposed to a multiplication operation. As with the forward propagation case, this reduces the computation overhead and thereby permits faster training of the network.

Providing networks with less computational overhead, and therefore faster response times and faster training times, permits implementing more complex networks. By implementing networks with many more connections and less computational overhead, the recognition capability of a network is greatly increased without increasing response times or training times to unacceptable levels.

BRIEF DESCRIPTION OF THE DRAWING

FIG. 6 illustrates an error discretizing function;

DESCRIPTION OF THE PREFERRED EMBODIMENT

Figure 1:
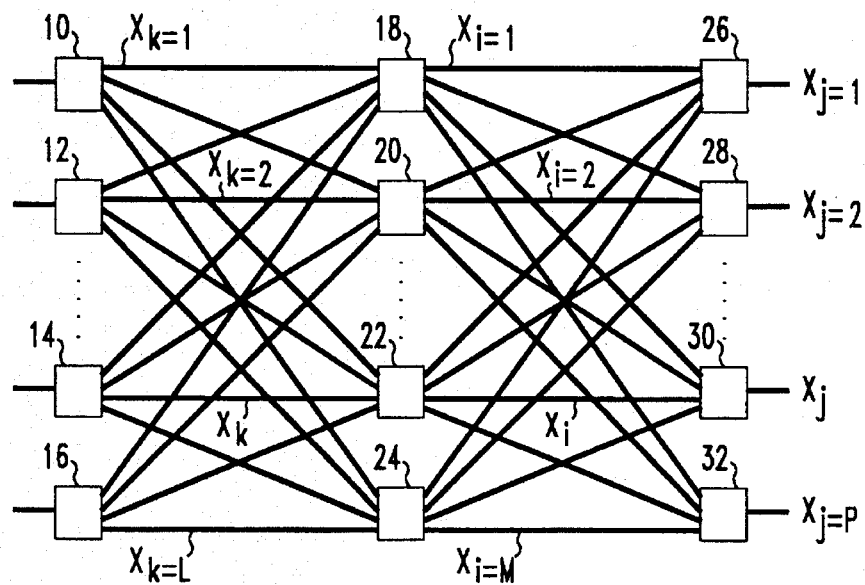
FIG. 1 illustrates a learning network architecture.

FIG. 1 illustrates a genetic neural or learning network architecture that may be implemented in hardware or software. In this example, there are 3 layers to the network; however, it is possible to configure networks with any number of layers. It is also possible to use other well-known connecting patterns such as those used by convolution neural networks and locally connected neural networks. Nodes 10, 12, 14 and 16 comprise the first layer, nodes 18, 20, 22 and 24 comprise the second layer and nodes 26, 28, 30 and 32 comprise the third layer. The third layer is the output layer. In this example, layers one, two and three are shown to contain L, M and P nodes, respectively, where L, M and P are any positive integer and where each layer may have a different number of nodes. The outputs of nodes 10, 12, 14 and 16 are represented by $X_k$ where k indexes from 1 through L. Middle layer nodes 18, 20, 22 and 24 have outputs represented by $X_i$ where i indexes from 1 through M. Likewise, the network outputs, which are the outputs of nodes 26, 28, 30 and 32, are represented by $X_j$ where j indexes from 1 through P. In this example, nodes of adjacent layers are fully connected, that is, each node in one layer is connected to every node of an adjacent layer. For example, the output of node 20 is connected to nodes 26, 28, 30 and 32, and the input to node 28 is connected to the output of nodes 18, 20, 22 and 24. Each connection between the output of a node in a preceding layer and the input of a node in a subsequent layer includes a multiplication which forms the product of the preceding node's output and a weight. The resulting product is received by an input of the node in the subsequent layer.

Figure 2:
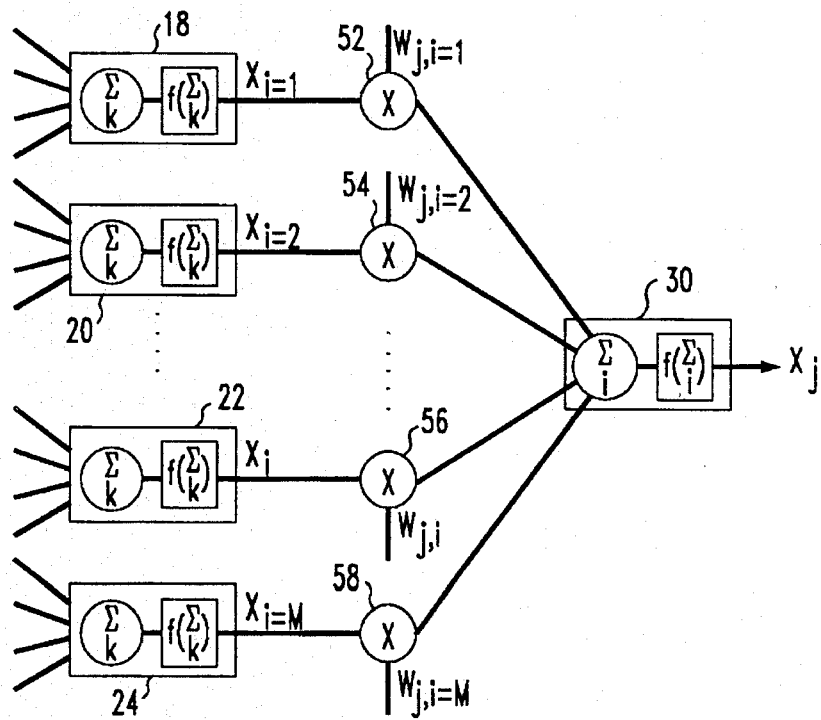
FIG. 2 illustrates the relationship between the inputs of one node and the outputs of several nodes.

FIG. 2 illustrates the operation of one node. Node 30 sums all of its inputs and then executes an activation function using that summation as an operand to produce output $X_j$. The inputs to node 30 are received from the outputs of multipliers 52, 54, 56 and 58. Each multiplier receives an input from the output of a node in a previous layer and multiplies that input by a weight. In this example, outputs $X_i$ (i=1 to M), which are received from the nodes of a previous layer, are multiplied by weights $W_{ji}$ (i=1 to M) in multipliers 52, 54, 56 and 58. If node 30 is not part of the output layer, output $X_j$ is used as an input to nodes in the next layer, and if node 30 is part of the output layer, output $X_j$ is one of the outputs from the network.

The network of FIG. 1 operates in two modes, a forward propagation mode and a backward propagation mode. In the forward propagation mode, an input or inputs are provided to the first layer of the network and outputs are provided at the output of the network. This involves the multiplication associated with each connection within the network, a summation of the products at the inputs to each node, and an activation function performed on the summation at each node. In the second or backward propagation mode, the network is trained. In this mode, inputs are provided to the network and the resulting outputs are observed for accuracy. An error is associated with each output and then an error gradient is calculated so that each of the weights in the interconnecting network can be adjusted. Each weight is adjusted by forming a product using the gradient, the output of the node from the previous layer and a learning rate.

Equation 1 illustrates the relationship between the outputs $X_i$ from the nodes in a previous layer and output $X_j$ of a node in a following layer.

$$X_j = f\left( \sum_i X_i W_{ji} \right) \tag{1}$$

Figure 3:
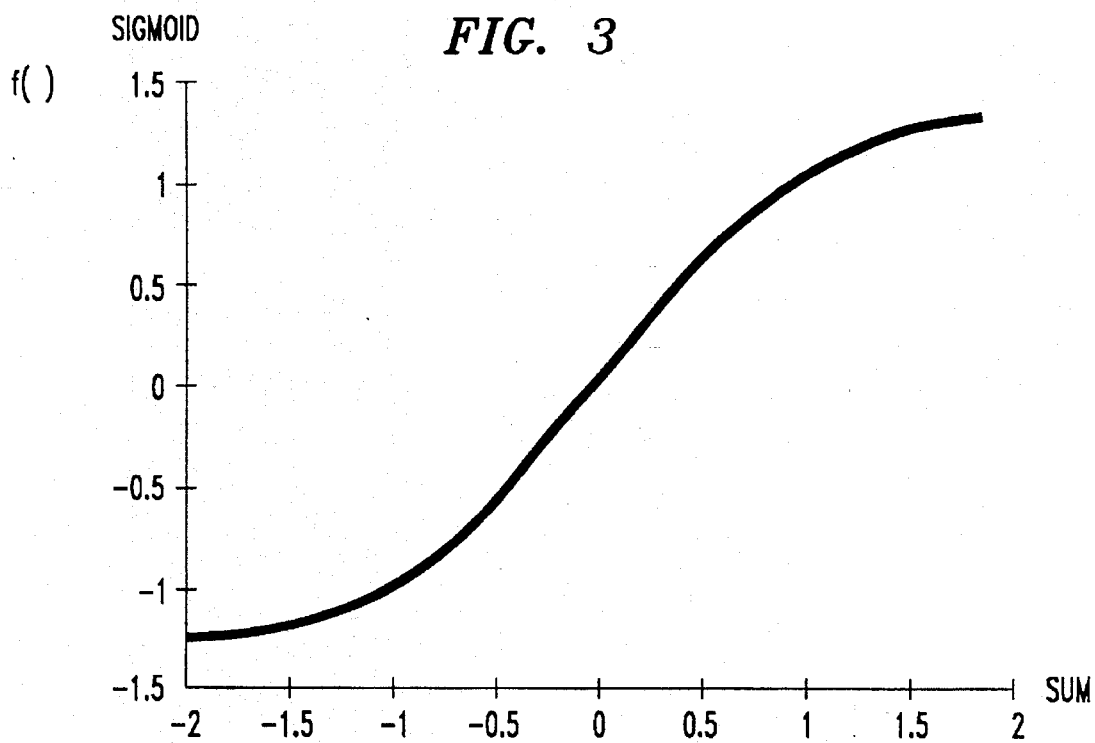
FIG. 3 illustrates a SIGMOID activation function.
Figure 4:
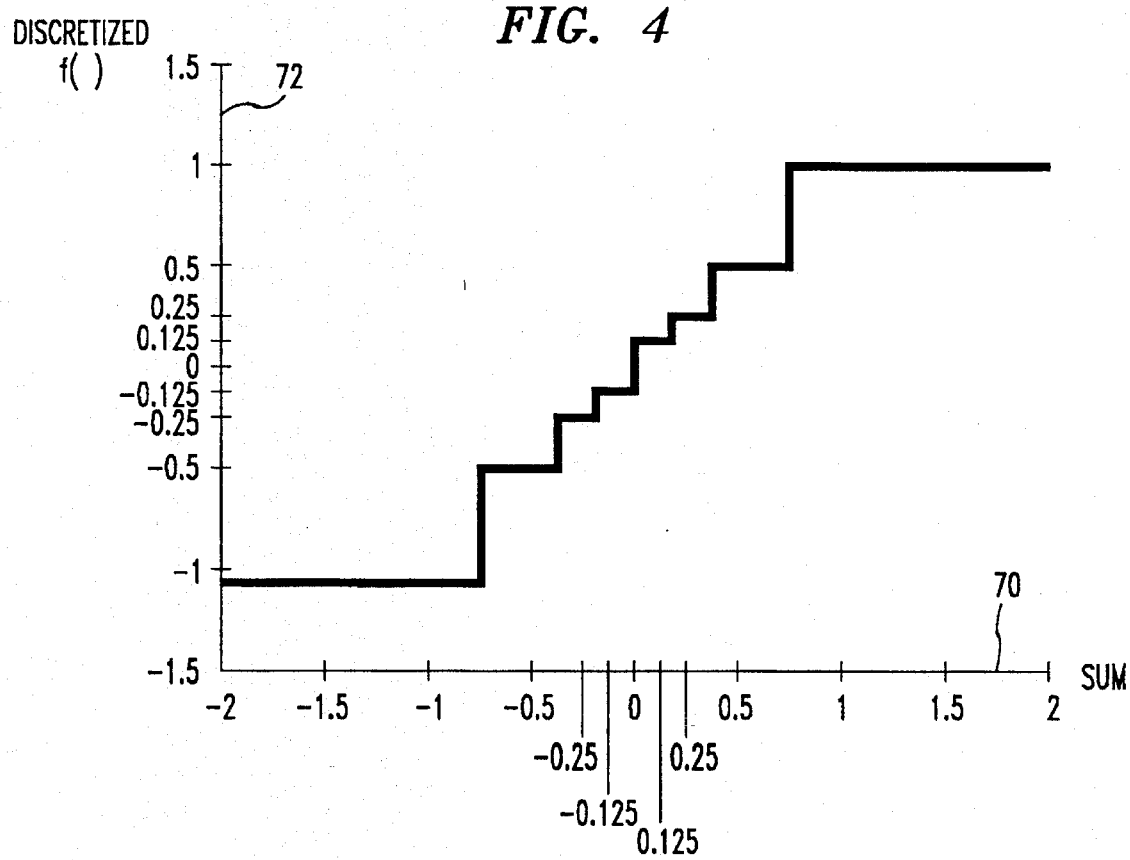
FIG. 4 illustrates a discretizing activation function.

The equation shows that each output $X_i$ received from a previous layer is multiplied by a weight $W_{ji}$ to produce i products. The resulting products are summed, and the sum is used as an operand by activation function f(). In the past, the activation function was a function such as a SIGMOID illustrated in FIG. 3. It is also possible to use many other well-known functions such as linear, spline and hyperbolic tangent. It is also possible to use different activation functions for nodes in different layers, or for nodes in the same layer. The present invention uses an activation function that discretizes its output so that it can be represented by a power of 2 or more specifically by $S2^n$ where n is an integer and S is +1 or −1. FIG. 4 illustrates such an activation function. This function can be implemented by using a look-up table in software embodiments or by using a PROM in hardware embodiments. The figure shows that for each value of the operand or summation on axis 70, a given value of X is produced as shown on axis 72. In this example, the values of X can be represented by $S2^n$ where n can have a value of 0, −1, −2 or −3. It is also possible to create functions where n can be any integer ( . . . +3, +2, +1, 0, −1, −2, −3 . . . ).

In reference to FIG. 2 the outputs $X_i$ from nodes of a previous layer are multiplied by weights $W_{ji}$ to form products using multiplier 52, 54, 56 and 58. By using the discretized activation function of FIG. 4, the outputs $X_i$ from each node can be represented by a sign bit and the value of n. As a result, the multiplications carried out by multipliers 52, 54, 56 and 58 may be executed by simply making the appropriate change to the sign bit of weight $W_{j,i}$ and then shifting the weight by the number of locations that are specified by n. For example, if the summation produced at the input to prior node 18 is equal to −0.4, the output of node 18 that results from using −0.4 as an operand of the activation function of FIG. 4 is −0.5. As a result, the output of node 18 is represented as $-2^{-1}$. When this output is used as an input to multiplier 52, weight $W_{j,i=1}$ is simply shifted one location to the right and the sign bit is changed to produce the result $X_{i=j} \cdot W_{j,i=1}$. This enables multiplier 52 and the other multipliers used in the connections within the network to be replaced by a simple shift register that shifts weight $W_{j,i}$ n times to the left or to the right. When n is negative, the weight is shifted to the right and when n is positive, the weight is shifted to the left. The sign bits of $W_{j,i}$ and $X_i$ can be passed through an EXCLUSIVE-OR gate to produce the sign bit of the product.

Inputs to the first layer of the network may also be discretized in accordance with FIG. 4. In network configurations where the network input is multiplied by a weight, representing the input as a power of 2 permits implementing these initial multiplications with shift operations.

Figure 5:
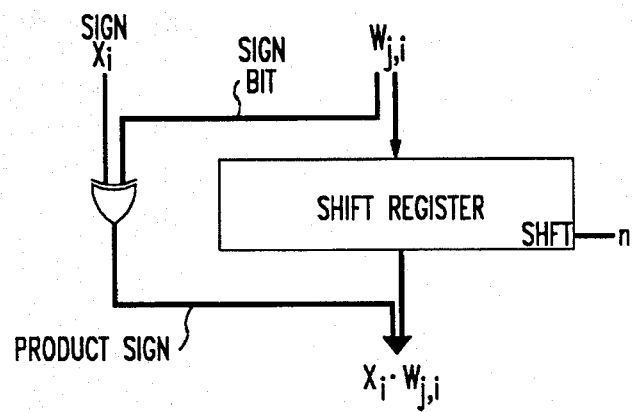
FIG. 5 illustrates a simplified multiplier.

FIG. 5 illustrates a simplified multiplier. A simple shift register and EXCLUSIVE-OR gate produce the product $X_i \cdot W_{j,i}$ without the use of a conventional multiplier. The value of n controls the number of shifts and the direction of the shifts. Using a shift register and simple logic gates to replace multipliers throughout the network results in a hardware and/or software reduction which reduces the computational overload associated with the network. When a network is implemented in software, replacing a multiplication with a shift operation decreases computation time and thereby decreases the network's response time.

In an effort to accommodate a wide variation in the values of the weights, it is possible to format the weights in the form of a mantissa and exponent; however, the weights may be represented in other forms such as a fixed point representation. When operating using a mantissa and exponent, the shift register of FIG. 5 can be replaced with an adder that is used to sum the exponent of the weight and n to obtain the product's exponent. In our prior example, where $X_i$ is equal to −0.5 and is expressed as $-2^{-1}$ where n=−1 and s=−1, the exponent of the weight is summed with −1 and sign bit of the weight is EXCLUSIVE-OR with the sign bit −1. It should be noted that the node receiving the resulting products in the form of a mantissa and exponent should perform the appropriate shifts to align the mantissas before a summation is formed.

The second mode of operation for learning or neural networks is the backward propagation mode. This mode is used to train or teach the network by adjusting the weights used in the network. The process involves providing a set of training inputs to the network and determining the error at the network's outputs. The errors are used to adjust the values of the weights. This process is continued using many different training inputs until the network produces outputs with acceptable errors. After allowing the network to produce a set of outputs in response to a set of training inputs, backward propagation begins by determining the error at each output of the network. The following equation provides an expression for output error E.

$$E = \sum_j e_j$$

$$e_j = \frac{1}{2}(X_j - T_j)^2 \tag{2}$$

Equation 2 shows that the error $e_j$ at output "j" is represented by the difference between an actual output $X_j$ and desired output $T_j$. Substituting equation 1 into equation 2 results in, equation 3 which provides another expression for error $e_j$.

$$e_j = \frac{1}{2}\left( f\left( \sum_i X_i W_{ji} \right) - T_j \right)^2 = \frac{1}{2}[f(S_j) - T_j]^2 \tag{4}$$

where $$S_j = \sum_i X_i W_{j,i}.$$

As a result, the output error E may be represented by equation 4.

$$E = \sum_j 1/2 \, [f(S_j) - T_j]^2 \tag{4}$$

The unit gradient $\partial E/\partial S_j$ for unit j of the last layer is given by equation 5.

$$G_j = \frac{\partial E}{\partial S_j} = (f(S_j) - T_j) f'(S_j) = H_j f'(S_j) \tag{5}$$

where the error term $H_j = f(S_j) - T_j$

Once the unit gradients of one layer are known, the unit gradients of previous layers may be calculated using the chain role. For example, equation 6 illustrates calculating unit gradients $G_i$ for unit i of the layer preceding layer j. Note that $$X_i = f\left( \sum_k X_k W_{ik} \right) = f(S_i)$$

and that $$S_j = \sum_i X_i W_{ji} = \sum_i f(S_i) W_{ji}$$

As a result, $$G_i = \frac{\partial E}{\partial S_i} = \sum_j \frac{\partial E}{\partial S_j} \frac{\partial S_j}{\partial S_i} = \sum_j G_j W_{ji} f'(S_i) = H_i f'(S_i) \tag{6}$$

In reference to equations 5 and 6, it can be seen that a gradient G for a layer may be computed using an error term H and a derivative term f'( ). For the output layer or last layer, the error term H is expressed by $$H_j = f(S_j) - T_j$$

and for previous layers, the error term H is expressed in the form $$H_i = \sum_j G_j W_{ji} \tag{7}$$

where layer i precedes layer j, and layer j is closer to the output layer than layer i.

The weights W, are adjusted using the gradient of E with respect to the weight of interest. For example, the gradient of E with respect to weight $W_{ji}$ is given by equation 8.

$$\frac{\partial E}{\partial W_{ji}} = \frac{\partial E}{\partial S_j} \frac{\partial S_j}{\partial W_{ji}} = G_j X_i \tag{8}$$

The weight adjustment is carried out by descending the gradient of E with respect to $W_{ji}$ as shown in equation 9.

$$W_{ji}^{new} = W_{ji}^{old} - \left[ LR \frac{\partial E}{\partial W_{ji}} \right] = W_{ji}^{old} - [LR \, G_j X_i] \tag{9}$$

Similarly, the weights in the layer i, which precedes layer j, are adjusting using $$\frac{\partial E}{\partial W_{ik}} = \frac{\partial E}{\partial S_i} \frac{\partial S_i}{\partial W_{ik}} = G_i X_k \tag{10}$$

and $$W_{ik}^{new} = W_{ik}^{old} - \left[ LR \frac{\partial E}{\partial W_{ik}} \right] = W_{ik}^{old} - [LR \, G_i X_k] \tag{11}$$

LR is the learning rate and typically has a small value such as 0.001. Many implementations vary the learning rate from unit to unit, and can vary the learning rate over time. It is also possible to limit LR to powers of 2, that is, $LR = 2^n$ where n is an integer. It is preferable to limit n to negative integers.

When beginning backward propagation, the gradient $G_j$ of the output layer is first computed according to equation 5. The term $H_j$, which is equal to $(F(S_j) - T_j)$, is discretized to the nearest power of two in accordance with the discretization function of FIG. 6. This function can be implemented using a look-up table in software embodiments and a PROM in hardware embodiments. In FIG. 6, every value on the horizontal axis is mapped to a power of two on the vertical axis. After discretization, $H_j$ can be stored in the form of $S2^n$ where n is an integer and S is $-1$ or $+1$.

Figure 7:
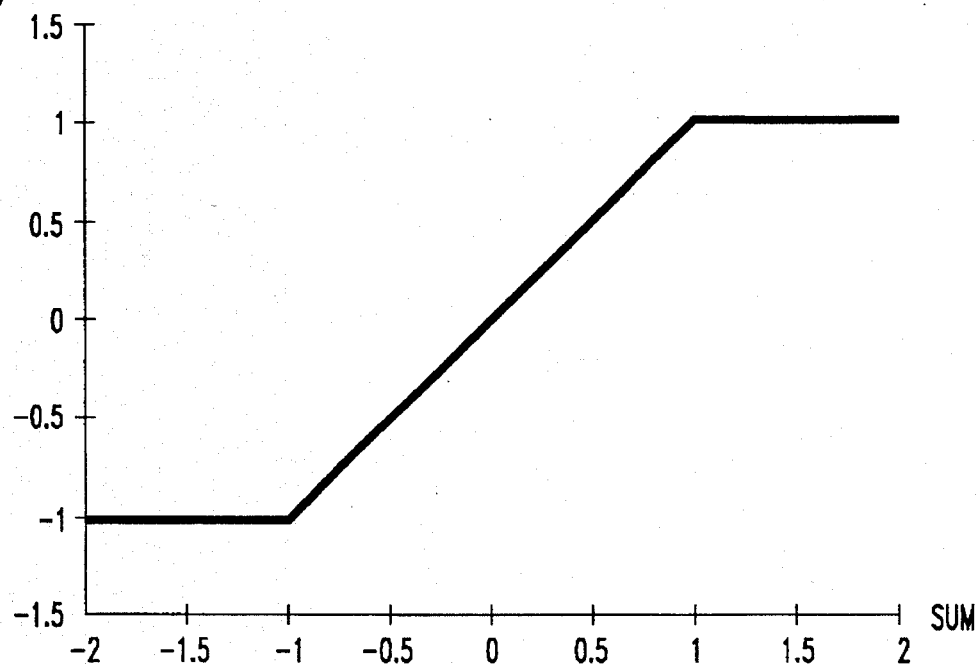
FIG. 7 illustrates an approximation for the activation function of FIG. 4.
Figure 8:
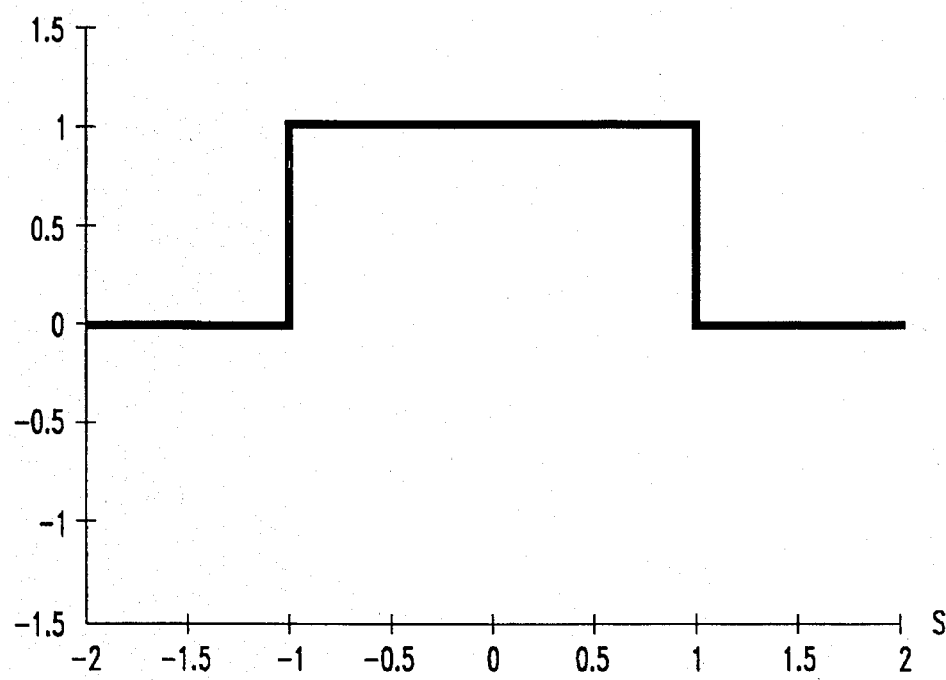
FIG. 8 illustrates a derivative of an activation function.

Equation 5 also requires forming the product $H_j f'(S_j)$. For the purpose of calculating $f'(\,)$ (the derivative of the activation), $f(\,)$, (the activation function of FIG. 4) is approximated by the function of FIG. 7. As can be seen in FIG. 8, the value of $f'(\,)$ is either 0 or 1. (The value 0 could also be a small power of 2 such as 0.125 to facilitate learning). When other activation functions are used, it is also possible to represent $f'(\,)$ as $S2^n$ when n is an integer and S is $\pm 1$. Multiplying $H_j$ by $f'(S_j)$ is carried out by determining if $S_j$ is between $-1$ and 1. If $S_j$ is between $-1$ and 1, the product is equal to $H_j$, and if $S_j$ is not between $-1$ and 1, the product is 0 (or a small power of 2 times $H_j$). If a small power of 2 such as $2^{-n}$ is used instead of 0, $H_j$ is shifted to the right by n bits. This completes the computation of the gradient $G_j$. It should be noted that $G_j$ is in the form of $S2^n$, where n is an integer, because $H_j$ is discretized in accordance with FIG. 6 and $f'(S_j)$ is either 0 or 1.

The weight update is made according to equation 9. It should be noted that $X_i$ is in the form $S2^n$ where n is an integer and S is $+1$ or $-1$. (Recall the activation function of FIG. 4). As a result, when beginning the calculation of equation 9 the product of gradient $G_j$ and node output $X_i$ is a simple addition of the values of n associated with $G_j$ and $X_i$. The sign bits of the product $G_j X_i$ is formed by EXCLUSIVE-ORING the sign bits of $G_j$ and $X_i$. It should be noted that since both $G_j$ and $X_i$ are in the form of $S2^n$, the product $G_j X_i$ is also in the form $S2^n$. As a result, multiplying learning rate LR by $G_j X_i$ involves simply shifting LR based on the value of n associated with the product $G_j X_i$ and EXCLUSIVE-ORING the sign bits. As a result, the new value of $W_{ji}$ is obtained using simple shift and add operations.

It should be noted that, by representing gradient $G_j$ and nodal output $X_i$ as $S2^n$, multiplication is no longer necessary to establish a new weight using equation 9. As mentioned earlier, eliminating multiplications permits faster operation and more complex networks.

Figure 9:
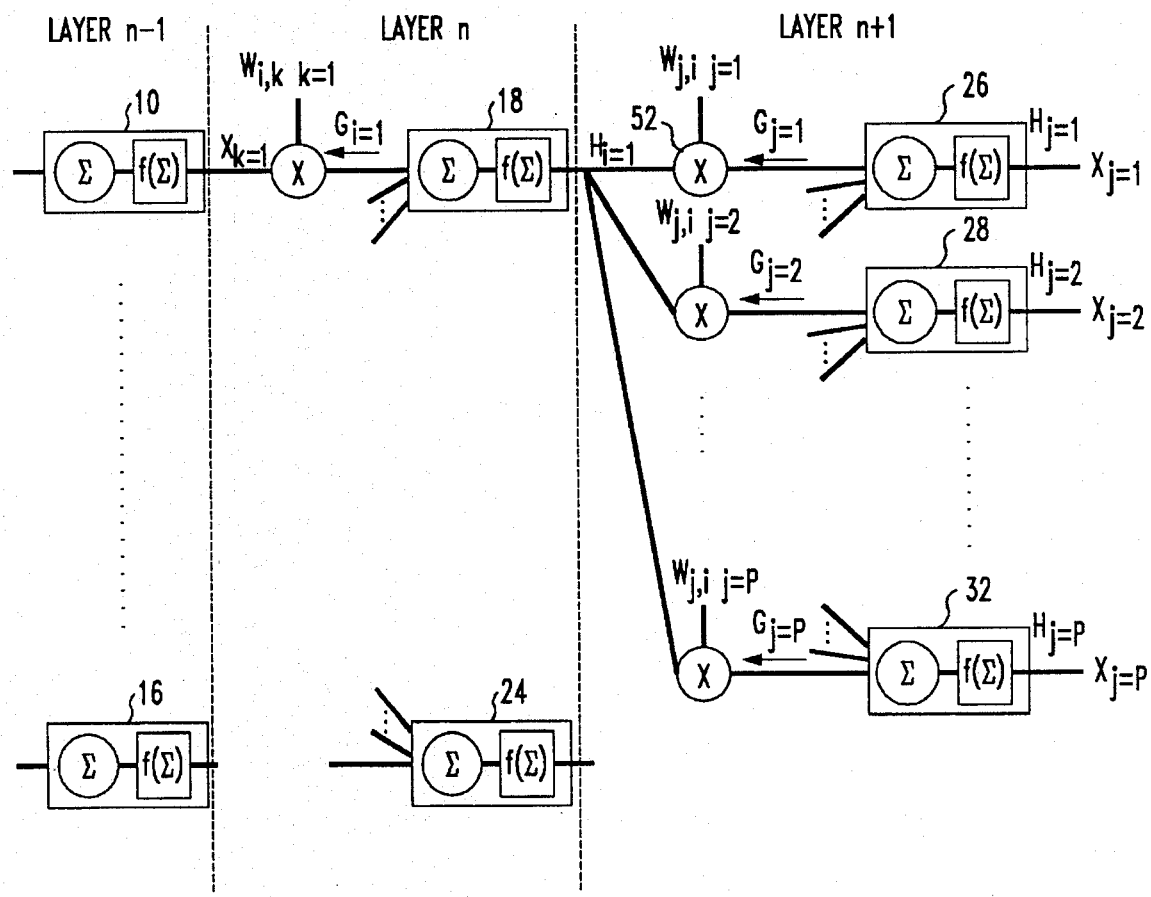
FIG. 9 illustrates the relationship between nodes of adjacent layers during backward propagation.

Generally speaking, and in reference to FIG. 9, weights at preceding layers of the network are adjusted using error values that are propagated backward through the network. For illustrative purposes we will assume that layer n precedes n+1 and layer n+1 is closer to the network output than layer n. An error term $H_i$ for each node of layer n is calculated by summing the products of the unit gradients $G_j$ from layer n+1 and their associated unadjusted weight values $W_{ji}$ from layer n+1 as illustrated in equation 7. The error term $H_i$ associated with each node of layer n is discretized to a power of 2, and is used to produce a unit gradient $G_i$ associated with each node of layer n in accordance with equation 6. The weights $W_{ik}$ of layer n are adjusted using the unit gradients $G_i$ of layer n and the outputs $X_k$ of layer n–1 as illustrated in equation 11. This procedure is repeated for preceding layers until all of the weights have been adjusted.

The nodes and multipliers may be implemented in software on a computer, or in hardware using analog or digital circuitry. In a hardware configuration, each node may be implemented using a microprocessor or a digital signal processing (DSP) chip. It is also possible to implement each node with an accumulator and a PROM where the accumulator sums the inputs and the PROM uses the sum to produce an output in the form of $S2^n$.

The weights can be stored in a memory such as a RAM or register. The weights can be updated by implementing the network on computer and then using a set of training inputs to develop output errors that are back propagated to change the weights. It is also possible to program the microprocessors or DSP chips to use error information from subsequent layers and outputs from previous layers to adjust the weights.

A nodal or learning network may be used to recognize speech, handwriting, pattern or objects. For example, the inputs to the first layer may be signals or values representative of an input such as an utterance or handwritten symbol. Once trained using backward propagation, the outputs produced in response to these inputs may be used to identify the utterance or handwritten symbol.

I claim:

1. A computational network that produces a plurality of network outputs in response to a plurality of network inputs, comprising:

a plurality of first layer computational nodes forming a first layer of a computational network, each of said first layer computational nodes receiving at least one input resulting from at least one of a plurality of computational network inputs to produce a first layer output, said first layer output being discretized to a nonzero integer power of 2; and;

a plurality of second layer computational nodes forming a second layer of the computational network, each of said plurality of second layer computational nodes receiving a plurality of inputs to produce a second layer output, each of said plurality of inputs being a product of a weight value and said first layer output produced by one of said plurality of first layer computational nodes, said second layer output being used to produce at least one of a plurality of network outputs.

2. The computational network of claim 1, wherein said first layer output is in the form of $S2^n$ where n is a nonzero integer and S is ±1.

3. The computational network of claim 2, further comprising product means for producing said product by shifting said weight value n times.

4. The computational network of claim 2, further comprising product means for producing said product by summing n and an exponent portion of said weight value.

5. The computational network of claim 1, wherein said plurality of network inputs are discretized to an integer power of 2.

6. A computational network that produces a plurality of network outputs in response to a plurality of network inputs, comprising:

a plurality of first layer computational nodes forming a first layer of a computational network, each of said first layer computational nodes receiving at least one first layer input resulting from at least one of a plurality of computational network inputs to produce a first layer output, said first layer output being discretized to a nonzero integer power of 2; and;

a plurality of second layer computational nodes forming a second layer of the computational network, each of said plurality of second layer computational nodes receiving a plurality of second layer inputs to produce a second layer output, each of said plurality of second layer inputs being a product of a weight value and said first layer output produced by one of said plurality of first layer computational nodes, said second layer output being produced by using a sum of said plurality of inputs as an operand of a first activation function, said second layer output being used to produce at least one of a plurality of network outputs.

7. The computational network of claim 6, wherein said first layer output is in the form of $S2^n$ where n is a nonzero integer and S is ±1.

8. The computational network of claim 7, further comprising product means for producing said product by shifting said weight value n times.

9. The computational network of claim 8, wherein said product means shifts said weight value in a first direction for positive values of n and in a second direction for negative values of n.

10. The computational network of claim 7, further comprising product means for producing said product by summing n and an exponent portion of said weight value.

11. The computational network of claim 6, wherein said plurality of network inputs are discretized to an integer power of 2.

12. The computational network of claim 6, wherein each of said first layer computational nodes produces said first layer output by using a sum of a plurality of first layer inputs as an operand of a second activation function.

13. The computational network of claim 12, wherein said first layer output is in the form of $S2^n$ where n is a nonzero integer and S is ±1.

14. The computational network of claim 13, further comprising product means for producing said product by shifting said weight value n times.

15. The computational network of claim 14, wherein said product means shifts said weight value in a first direction for positive values of n and in a second direction for negative values of n.

16. The computational network of claim 13, further comprising product means for producing said product by summing n and an exponent portion of said weight value.

17. The computational network of claim 12, wherein said plurality of network inputs are discretized to an integer power of 2.

18. The computational network of claim 12, wherein said first and second activation functions are the same.

19. A method of recognizing a user's input, comprising the steps of:

forming a first plurality of values representative of the user's input, said first plurality of values being discretized to a nonzero integer power of 2;

producing a first plurality of products using said first plurality of values and a first plurality of weights;

producing a second plurality of products using said first plurality of values and a second plurality of weights;

using a first computational node belonging to a plurality of first layer computational nodes to produce a first output by forming a sum of said first plurality of products and by using said sum of said first plurality of products as an operand of a first activation function;

using a second computational node belonging to said plurality of first layer computational nodes to produce a second output by forming a sum of said second plurality of products and by using said sum of said second plurality of products as an operand of a second activation function;

forming a first product using said first output and a first weight value;

forming a second product using said second output and a second weight value;

using a second layer computational node belonging to a plurality of second layer computational nodes to produce a second layer output by forming a sum of said first and second products and by using said sum of said first and second products as an operand of a third activation function; and using said second layer output to produce at least one of a plurality of network outputs that identify the user's input.

20. The method of claim 19, wherein said user's input is an utterance.

21. The method of claim 19, wherein said user's input is a handwritten symbol.

22. The method of claim 19, further comprising adjusting said first plurality of weights using an error value discretized to an integer power of 2.

23. The method of claim 22, further comprising adjusting said first plurality of weights using a learning rate discretized to an integer power of 2.

24. The method of claim 22 wherein said error value is in the form $S2^n$ where n is an integer and S is $\pm 1$.

25. The method of claim 22, wherein said step of adjusting said first plurality of weights comprises forming a product of said error value and a derivative value discretized to a power of 2, said discretized derivative value obtained by using said sum of said first plurality of products as an argument of a derivative function, said derivative function being a derivative of an approximation of said first activation function.

26. The method of claim 25, wherein said derivative value is in the form $S2^n$ where n is an integer and S is $\pm 1$.

27. The method of claim 25, wherein said derivative value is discretized to a value of 1 or 0.

28. The method of claim 25, further comprising adjusting said first plurality of weights using a learning rate discretized to an integer power of 2.

29. The method of claim 19, further comprising adjusting said first plurality of weights using a derivative value discretized to a power of 2, said discretized derivative value obtained by using said sum of said first plurality of products as an argument of a derivative function, said derivative function being a derivative of an approximation of said first activation function.

30. The method of claim 29, wherein said derivative value is in the form $S2^n$ where n is an integer and S is $\pm 1$.

31. The method of claim 29, further comprising adjusting said first plurality of weights using a learning rate discretized to a power of 2.

* * * * *